Sept. 11, 1934.    T. F. MOONEY    1,973,092
METHOD AND APPARATUS OF FORMING TILE
Filed Feb. 12, 1932    2 Sheets-Sheet 1
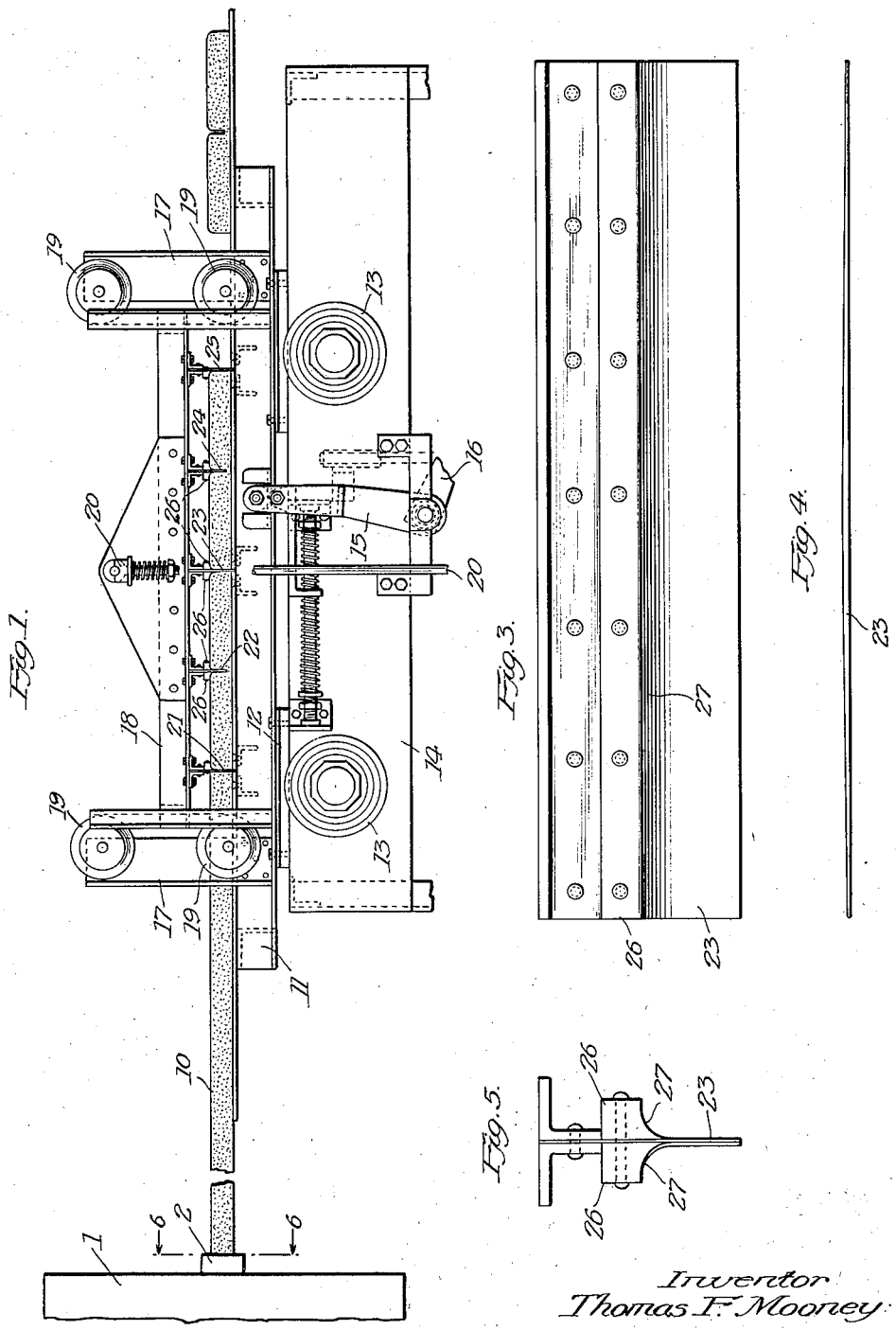
Inventor
Thomas F. Mooney
By Wilson, Dowell, McCanna & Pelun
Attys
Witness
R. B. Davison Sept. 11, 1934.  T. F. MOONEY  1,973,092
METHOD AND APPARATUS OF FORMING TILE
Filed Feb. 12, 1932  2 Sheets-Sheet 2
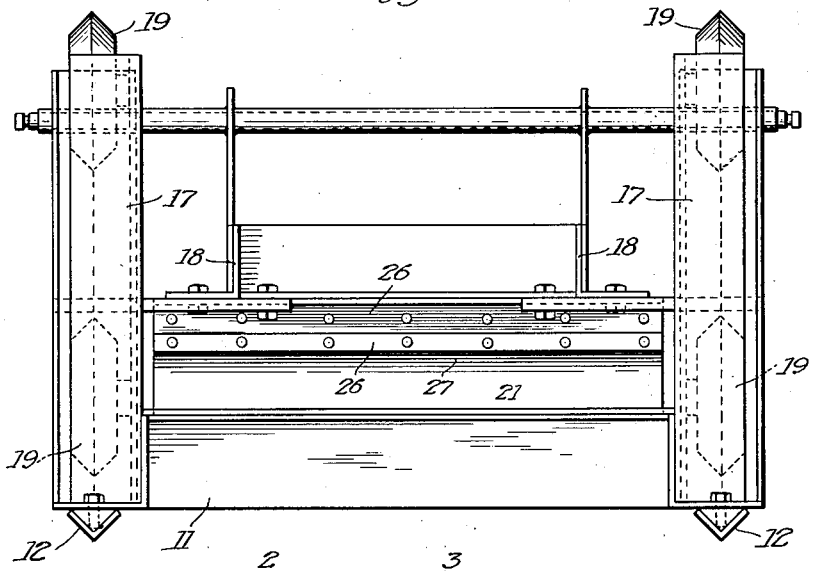
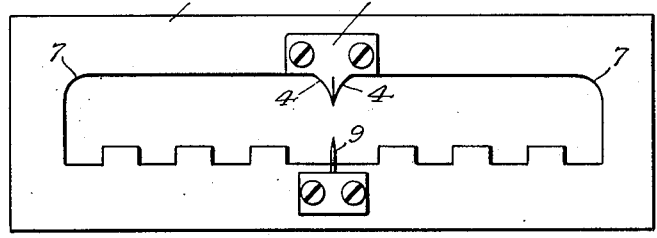
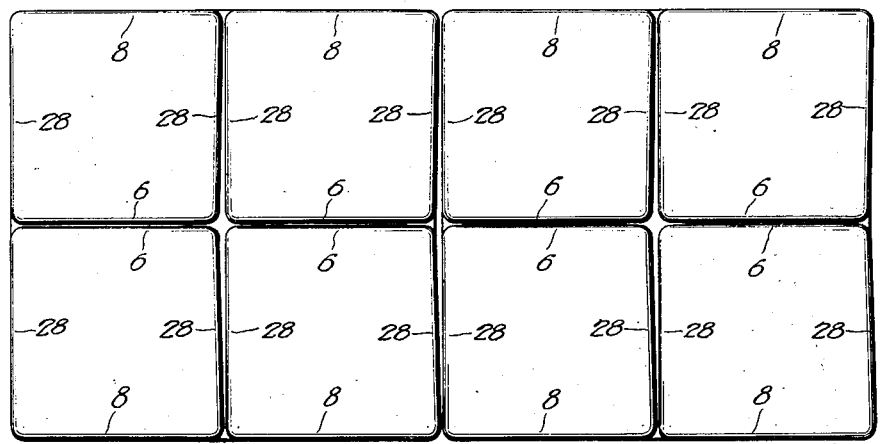
Inventor
Thomas F. Mooney Patented Sept. 11, 1934

1,973,092

UNITED STATES PATENT OFFICE 1,973,092

METHOD AND APPARATUS OF FORMING TILE

Thomas F. Mooney, New Lexington, Ohio, assignor to Ludowici-Celadon Company, Chicago, Ill., a corporation of Illinois Application February 12, 1932, Serial No. 592,497

10 Claims. (Cl. 25—105)

This invention relates to a tile cutting and forming machine although it will be manifest that the principles thereof may be applied to forming bricks and other ceramic articles.

It is common practice in the manufacture of tile to extrude a column of clay from an auger machine through a suitably shaped die and pass the extruded column over a cutting table upon which the column of clay is cut and/or scored to form or partially form the particular shape and style of tile desired. The cutting is accomplished by knives operated either automatically or manually.

Considerable difficulty has been experienced in forming a tile having straight parallel edges after baking due to the expansion of the clay, particularly the center portion of the column of clay after it has passed out of the mouth of the die. Shrinkage of the clay during baking also increases the difficulties in obtaining straight edges on the finished tile. Both deformations have made it necessary in some instances to reject large quantities of the product or trim the product to eliminate the deformed ends.

It is the purpose of this invention to make it possible to provide a tile having straight parallel edges and to reduce the cost of manufacture by increasing the speed of operation and eliminating one of the steps in the process of manufacture as a separate operation. In accordance with this invention the cutting knife or knives are so shaped as to compensate for both extension and shrinkage of the column of clay whereby the finished product after baking will have straight parallel sides. A better understanding will be had of my invention from the following description given in connection with the drawings in which:

Fig. 1 is a side elevation of a portion of an extruding machine and a tile cutting machine embodying the principles of this invention;

Fig. 2 is an end elevation of the cutting blades and cutter carriage;

Fig. 3 is a side elevation of a single cutting blade;

Fig. 4 is a bottom plan view of the cutting edge of the knife;

Fig. 5 is an end elevation of the complete knife;

Fig. 6 is an end elevation of the auger die taken on line 6—6 of Fig. 1; and

Fig. 7 is a plan view of a tile slab as cut by a machine as shown in Fig. 1, and prior to baking.

Referring to the figures, there is illustrated in Fig. 1 the discharge end of an auger machine terminating in a die 2, the shape of the latter being shown more particularly in Fig. 6. In the present instance, the die is provided with a scoring blade 3 at the center of its upper wall and which projects downwardly and makes a longitudinal cut into the center of the column of clay as it is extruded through the die. The sides of the knife are concaved as at 4 to bevel the longitudinal score and form the beveled edges 6 in the tile slab illustrated in Fig. 7. The upper corners of the die opening are rounded as at 7 to bevel the longitudinal outside corners of the column of clay and provide the fettled edges 8 on the tile slab as shown in Fig. 7. In the present instance the tile slab is scored from the bottom by a thin knife blade 9 secured to the lower face of the die opening. The lower surface of the column of clay is also grooved longitudinally by the grooved formation of the lower face of the die.

The column of clay 10 extruded from the auger is fed onto a sliding cutting table 11 having guideways 12 which engage rollers 13 on the table bed 14. The table in the illustrated machine is moved synchronously with the moving column of clay by a reciprocating mechanism indicated generally by reference character 15 and which is actuated by a link 16 from any suitable driving mechanism, not shown. Secured to the sliding cutting table 11 are uprights 17 within which a cutter carriage 18 is mounted for vertical reciprocations, the carriage having rollers 19 guided within the uprights 17. The cutter frame is reciprocated vertically by a rod 20 through a suitable mechanism, not shown.

Attached to the cutter frame are five transverse knives 21, 22, 23, 24 and 25, the knives being of sufficient length to extend completely across the width of the column of clay. Knives 21, 23 and 25 have sufficient depth of blade to cut completely through the column of clay whereas knives 22 and 24 are somewhat shorter and do not cut completely through the column of clay. Furthermore, knife 21 is a plane surface knife, that is, both sides of the knife are parallel and flat, whereas knives 22, 23, 24 and 25 each have a convex cutting edge made by one convex side as shown more particularly in Figs. 4 and 5. In other words, the cutting edge is convex in a direction parallel to the thickness of the cutting edge or transverse to the cutting movement of the blade. The knives are secured to the cutter frame with the convex side facing the auger machine. The convexity is of such degree as to compensate for the growth or elongation of the column of clay which normally takes place and which would otherwise cause the finished piece of tile to have a convex edge due to this elongation which takes place prior to baking. The convexity of the blade must not be so great however as to cause a concavity of the edge of the finished article which would happen if the elongation was fully compensated for due to the fact that there is some shrinkage of the clay in baking. The degree of curvature of the convex edge of the knife must of course be varied to suit variable conditions prevalent in different clays and baking periods.

In order to eliminate the usual separate operation of fettling where beveled edges are desired, the knives may be provided with integral or separately attached and detachable shoulder pieces 26 having upwardly and outwardly concaved surfaces 27 extending from the knife surfaces as clearly shown in Figs. 3 and 5. The shoulders are disposed relatively to the cutting edge in accordance with the thickness of tile desired, and whether the knife is to cut or merely score the column of clay the distance between the concaved surfaces 27 and the cutting edge of the knife being such that as the blade completes its cutting movement the concaved surfaces 27 will engage the upper corners of the tile and form a bevel thereon. These beveled edges are indicated at 28 as shown in Fig. 7. As is clearly shown in Fig. 1 the knives 21 and 25 carry shoulders only upon the inner surfaces whereas the remaining knives carry shoulders upon both surfaces.

From the foregoing description it will be apparent that there has been provided an apparatus for cutting tile, the principles of which may be applied to the cutting of other articles in which it is assured that the completed articles will have straight parallel tiles, compensation having been made for elongation and shrinkage, and in which the fettling operation as a separate operation has been eliminated by being combined with the cutting operation as one operation.

It is obvious that although the illustrated embodiment shows the fabrication of a tile slab into eight tiles, the size and division of the slab is immaterial, being dependent upon the movement of the knives, and of the auger die. It is also apparent that in some uses it may be desirable to provide fettling shoulders on both sides of each blade and also that it may be desirable to convex both surfaces or sides of the cutting knives. Many other changes in the details of construction will be apparent to those skilled in the art without departing from the spirit and scope of the invention as defined in the appended claims.

I claim:

1. A reciprocating cutting knife for use in tile cutting machines comprising a relatively thin blade having a cutting edge convex in a direction transverse to the reciprocating cutting movement of the knife.

2. A reciprocating cutting knife for use in tile cutting machines comprising a relatively thin blade having a plano convex cutting edge.

3. A reciprocating cutting knife for use in tile cutting machines comprising a relatively thin blade having a convex surface parallel to the reciprocating cutting movement of the blade.

4. A reciprocating cutting and fettling knife for use in tile cutting machines comprising a relatively thin cutting blade having a cutting edge convex in a direction transverse to the reciprocating cutting movement of the knife, and a fettling shoulder extending from one side thereof a predetermined distance above the cutting edge of the blade, said shoulder having a fettling surface extending outwardly and upwardly from the side of said knife.

5. In the process of making tile by extruding plastic material in a strip of uniform cross section and supporting the moving strip while severing the same transversely into tile lengths, the improvement which consists in so severing the strip by making cuts therein concave at the side toward the extruding die and not convex at the other side, so as to compensate for central elongation of the strip after cutting.

6. In a tile making machine having a die through which plastic material is forcibly extruded in the form of a strip of uniform cross section and having a traveling table which supports the moving strip during the cutting thereof, cutting means movable with the strip comprising a straight cutter blade arranged crosswise of the strip and mounted for straight line reciprocation in a plane intersecting the supporting surface of said table, said blade having its rear surface slightly convex in a direction at right angles to the direction of reciprocation of the blade, the thickness of the blade being greatest at its middle and gradually decreasing toward the ends for producing such convexity, whereby the transverse cut in the strip is concave at the side of the blade toward said extruding die but is not convex at the front side of the blade.

7. In a tile making machine having a die through which plastic material is forcibly extruded in the form of a strip of uniform cross section and having a traveling table which supports the moving strip during the cutting thereof, cutting means movable with the strip comprising a straight cutter blade arranged crosswise of the strip and mounted for straight line reciprocation in a plane intersecting the supporting surface of said table, said blade having a substantially flat front side and its back side being convex in a direction at right angles to the direction of movement of the blade, substantially as and for the purpose set forth.

8. In a tile making machine having a die through which plastic material is forcibly extruded in the form of a strip of uniform cross section and having a traveling table which supports the moving strip during the cutting thereof, cutting means movable with the strip comprising a straight cutter blade arranged crosswise of the strip and mounted for straight line reciprocation in a plane normal to the supporting surface of said table, said blade having its rear surface slightly convex in a direction at right angles to the direction of reciprocation of the blade, the thickness of the blade being greatest at its middle and gradually decreasing toward the ends for producing such convexity, whereby the transverse cut in the strip is concave at the side of the blade toward said extruding die but is not convex at the front side of the blade.

9. In a tile making machine having a die through which plastic material is forcibly extruded in the form of a strip of uniform cross section and having a traveling table which supports the moving strip during the cutting thereof, cutting means movable with the strip comprising a straight cutter blade arranged crosswise of the strip and mounted for straight line reciprocation in a plane intersecting the supporting surface of said table, said blade having its rear surface slightly convex in a direction at right angles to the direction of reciprocation of the blade, the thickness of the blade being greatest at its middle and gradually decreasing toward the ends for producing such convexity, whereby the transverse cut in the strip is concave at the side of the blade toward said extruding die but is not convex at the front side of the blade, said blade having a lateral fettling shoulder a predetermined distance from the cutting edge of the blade.

10. In a tile making machine having a die through which plastic material is forcibly extruded in the form of a strip of uniform cross section and having a traveling table which supports the moving strip during the cutting thereof, cutter mechanism movable with said table comprising a series of spaced cutter blades arranged crosswise of the strip and mounted for straight line reciprocation in parallel planes intersecting the plane of said table, the blades being alternately of sufficient and insufficient depth to cut through the strip, the blades succeeding the one nearest the extruding die having their rear surfaces slightly convex in a direction at right angles to the direction of reciprocation of the blades but their front surfaces not convex.

THOMAS F. MOONEY.